US009584477B2

(12) United States Patent
Williams et al.

(10) Patent No.: US 9,584,477 B2
(45) Date of Patent: Feb. 28, 2017

(54) PACKET PROCESSING IN A MULTI-TENANT SOFTWARE DEFINED NETWORK (SDN)

(71) Applicant: International Business Machines Corporation, Armonk, NY (US)

(72) Inventors: Ronald Becker Williams, Austin, TX (US); Cheng-Ta Lee, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 14/632,631

(22) Filed: Feb. 26, 2015

(65) Prior Publication Data
US 2016/0255051 A1 Sep. 1, 2016

(51) Int. Cl.
*H04L 29/06* (2006.01)
(52) U.S. Cl.
CPC .......... *H04L 63/0236* (2013.01); *H04L 63/10* (2013.01); *H04L 63/20* (2013.01)
(58) Field of Classification Search
None
See application file for complete search history.

(56) References Cited

U.S. PATENT DOCUMENTS

| 8,464,335 | B1 * | 6/2013 | Sinha | G06F 21/51 713/153 |
|---|---|---|---|---|
| 8,612,541 | B2 | 12/2013 | Maxted | |
| 9,264,400 | B1 * | 2/2016 | Lin | H04L 63/0245 |
| 2008/0270606 | A1 * | 10/2008 | Gooch | H04L 12/4633 709/225 |
| 2013/0266007 | A1 | 10/2013 | Kumbhare et al. | |
| 2013/0304917 | A1 | 11/2013 | Mittal et al. | |
| 2014/0173694 | A1 * | 6/2014 | Kranz | G06F 21/606 726/4 |
| 2014/0215465 | A1 * | 7/2014 | Elzur | G06F 9/45533 718/1 |
| 2014/0364115 | A1 * | 12/2014 | Fidler | H04W 36/0033 455/432.1 |
| 2014/0376367 | A1 * | 12/2014 | Jain | H04L 47/20 370/230 |

(Continued)

OTHER PUBLICATIONS

Nakagawa et al, "A management method of IP multicast in overlay networks using OpenFlow," HotSDN'12, Aug. 13, 2012.

(Continued)

*Primary Examiner* — Christopher Revak
(74) *Attorney, Agent, or Firm* — Jeffrey S. LaBaw; David H. Judson

(57) ABSTRACT

An SDN controller associated with a switch maintains unique tenant/port association data, and pushes to the switch per-tenant policies. A per-tenant information processing port (IPP) on the switch enables traffic sent to or from a tenant to be distinguished from that of another tenant, even with respect to packet processing devices (PPDs) that share a particular switch. With the described approach, the properties of a non-overlay SDN are leveraged to support multi-tenancy in an efficient manner, preferably by associating a specific tenant with a specific port (on the virtual switch) once, rather than continuously parsing tenant data from the information flow. The technique enables the application of tenant-specific policy to tenant-specific network flows in a multi-tenant network.

21 Claims, 11 Drawing Sheets

(56) References Cited

U.S. PATENT DOCUMENTS

| | | | |
|---|---|---|---|
| 2015/0215219 A1* | 7/2015 | Mattsson | H04L 47/2475 370/401 |
| 2015/0222445 A1* | 8/2015 | Iyer | H04L 12/185 370/390 |
| 2016/0087885 A1* | 3/2016 | Tripathi | H04W 76/022 370/389 |
| 2016/0191545 A1* | 6/2016 | Nanda | H04L 43/062 726/1 |
| 2016/0205071 A1* | 7/2016 | Cooper | H04L 12/6418 726/1 |
| 2016/0248681 A1* | 8/2016 | Gal Or | G06F 9/505 |

OTHER PUBLICATIONS

Racherla, et al, "Implementing IBM Software Defined Network for Virtual Environments," Chapters 1-2, Sep. 2014.

\* cited by examiner

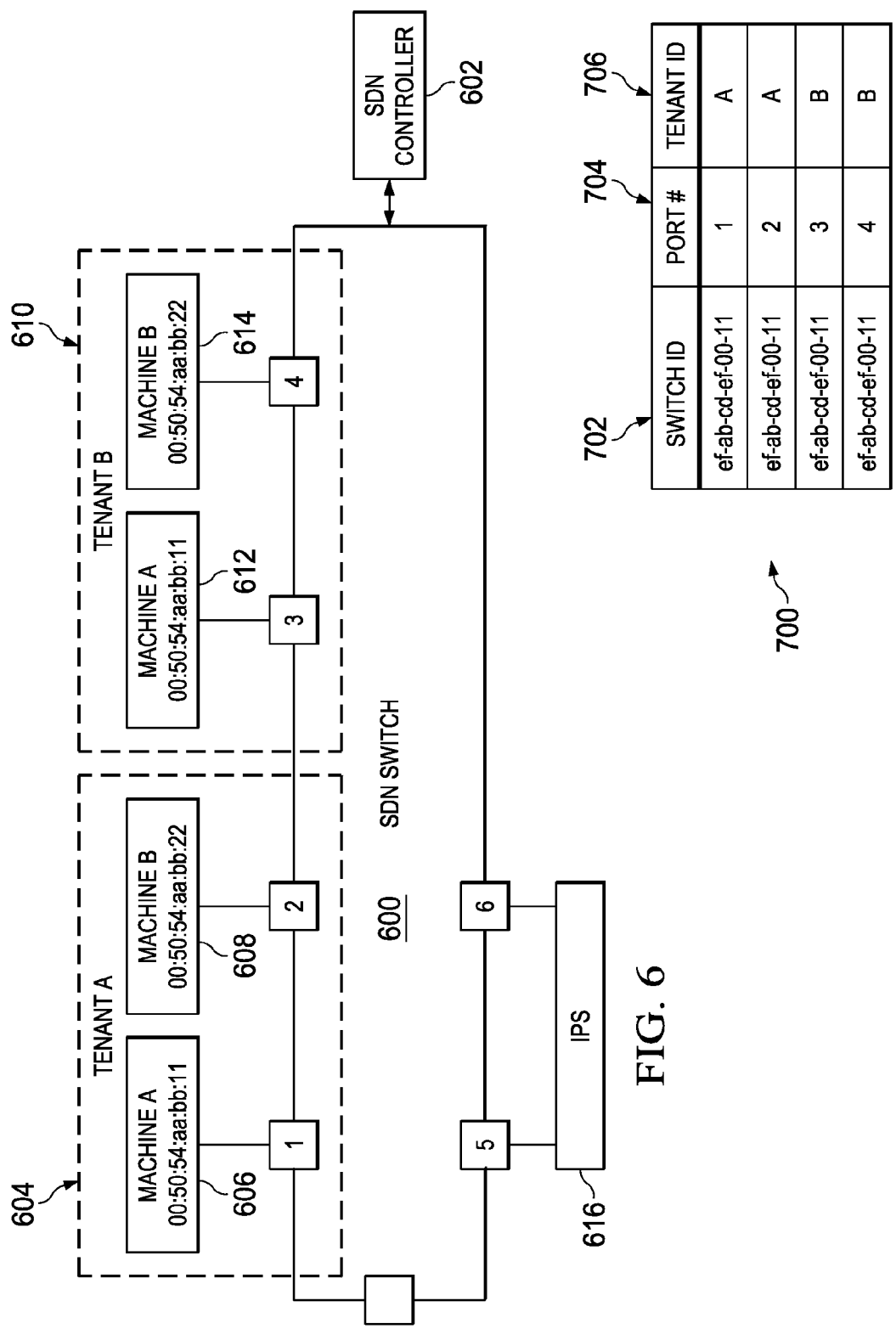

| IN ←1302 | Tenant ID ←1304 | SRC MAC ←1306 | DST MAC ←1308 | SRC IP ←1310 | DIST IP ←1312 | SRC PORT ←1314 | DST PORT ←1316 | ACTION ←1318 |
|---|---|---|---|---|---|---|---|---|
| Vswitch 001 | 123 | * | * | * | * | * | * | OUT: PPD001 |
| PPD001 | * | * | * | 1.2.3.4 | * | * | * | FORWARD |
| PPD001 | * | * | * | * | * | * | * | OUT: PPD002 |
| PPD002 | * | * | * | * | * | * | * | FORWARD |

PACKET PROCESSING IN A MULTI-TENANT SOFTWARE DEFINED NETWORK (SDN)

BACKGROUND OF THE INVENTION

Technical Field

This disclosure relates generally to protecting resources in a virtualized networking environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Software Defined Networking (SDN) is a new network paradigm that separates each network service from its point of attachment to the network, creating a far more dynamic, flexible, automated, and manageable architecture. Using this approach, administrators can easily move virtual resources throughout the network, create private virtual networks that meet specific performance and security needs, and use a host of other high-value applications. SDN abstracts flow control from individual devices to the network level. Similar to server virtualization, where virtual machines are de-coupled from the physical server, network-wide virtualization gives administrators the power to define network flows that meet the connectivity requirements of end stations and to address the specific needs of discrete user communities. SDN pulls the intelligence away from the hardware while still implementing rich feature sets. SDN uses a modular approach that is structured and layered to provide the same functions as a traditional network device, yet in a centralized and highly-available fashion.

SDNs address the administration requirements of large scale networks, both physical and virtual. Using an SDN, service providers that deliver network capability to multiple clients are able to manage their policy and event data distinctly and separately. This multi-tenant capability is an important value proposition to service providers and tenants alike.

There are two common mechanisms for information transmission in an SDN: "direct" and "overlay." Direct information transmission uses raw network frames and the information they convey; in contrast, overlay networks use encapsulation (tunneling) to transmit additional information (e.g., tenant identity) in addition to the encapsulated information. An SDN tunneling protocol associates a tenant-specific flow with a protocol tunnel, which contains tenant identification information. While both types of information transmission are commonly-used, there is significant overhead associated with processing flows encapsulated in tunneling protocols. As a consequence, the application of tenant-specific policy to tenant-specific network flows is difficult to carry out in a highly-performant manner.

There is need to provide for high performance tenant-specific processing using direct SDN properties, while avoiding overlay overhead that is incurred by the need to process tenant-specific flows encapsulated in tunneling protocols.

BRIEF SUMMARY

According to this disclosure, the properties of a non-overlay SDN are leveraged to support multi-tenancy in an efficient manner, preferably by associating a specific tenant with a specific port (on a virtual switch) once, rather than continuously parsing tenant data from the information flow. The technique enables the application of tenant-specific policy to tenant-specific network flows.

To facilitate this operation, an SDN controller maintains unique tenant/port association data, and pushes to the switch per-tenant policies (e.g., packet forwarding rules) to ensure compliance with the multi-tenant security policy requirements. A per-tenant information processing port (IPP) on the switch enables traffic sent to or from a tenant to be distinguished from that of another tenant, even with respect to packet processing devices (PPDs) that share a particular switch.

In one particular aspect, the disclosure describes a method to process packets in a multi-tenant Software Defined Network (SDN) having a switch, which may be physical or virtual. The method preferably is implemented in an SDN controller that manages the switch. According to the method, preferably each tenant (of a set of multiple tenants that use the SDN) is assigned a particular port of the switch as an information processing port (IPP) for the tenant. The SDN controller maintains the port/tenant associations in a data set. The SDN controller configures the switch according to information in the data set, and one or more tenant-specific policies. At least one tenant-specific policy is then applied to a tenant-specific packet flow based on the IPP for the tenant.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 depicts an SDN switch and its associated SDN controller that is used to maintain tenancy on an SDN network according to this disclosure;

FIG. 7 is a data table that associates tenants and switch ports;

FIG. 13 depicts a representative PPD policy that implements representative forwarding rules to facilitate the forwarding operation across multiple PPDs as shown in FIG. 12.

DETAILED DESCRIPTION OF AN ILLUSTRATIVE EMBODIMENT

Figure 1:
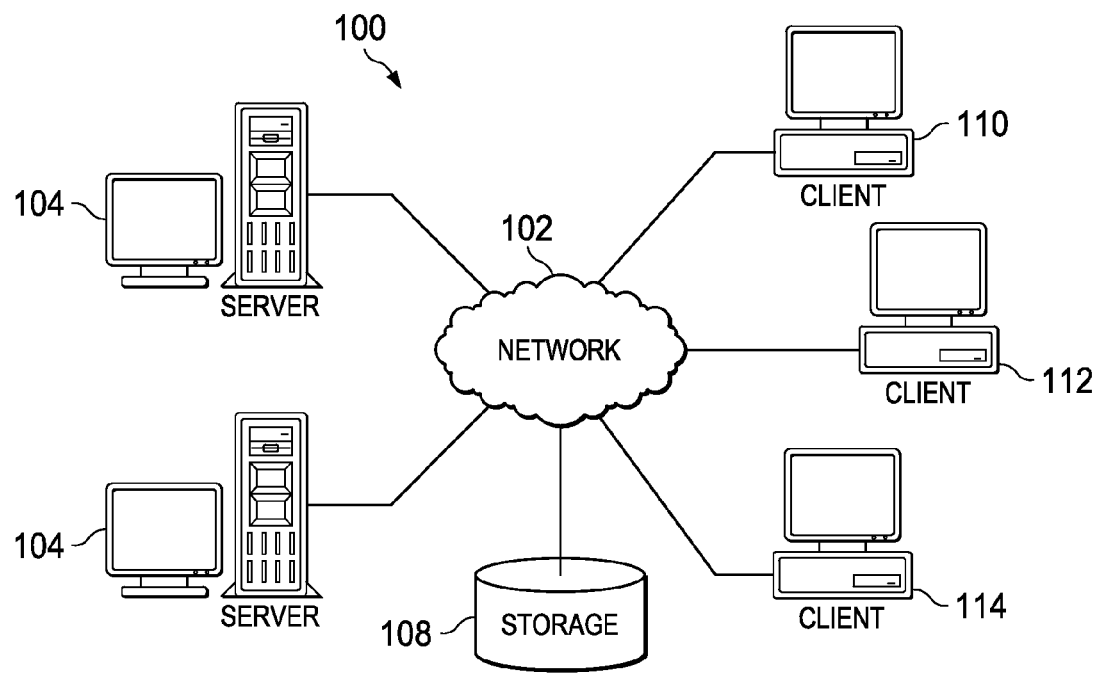
FIG. 1 depicts an exemplary block diagram of a distributed data processing environment in which exemplary aspects of the illustrative embodiments may be implemented.
Figure 2:
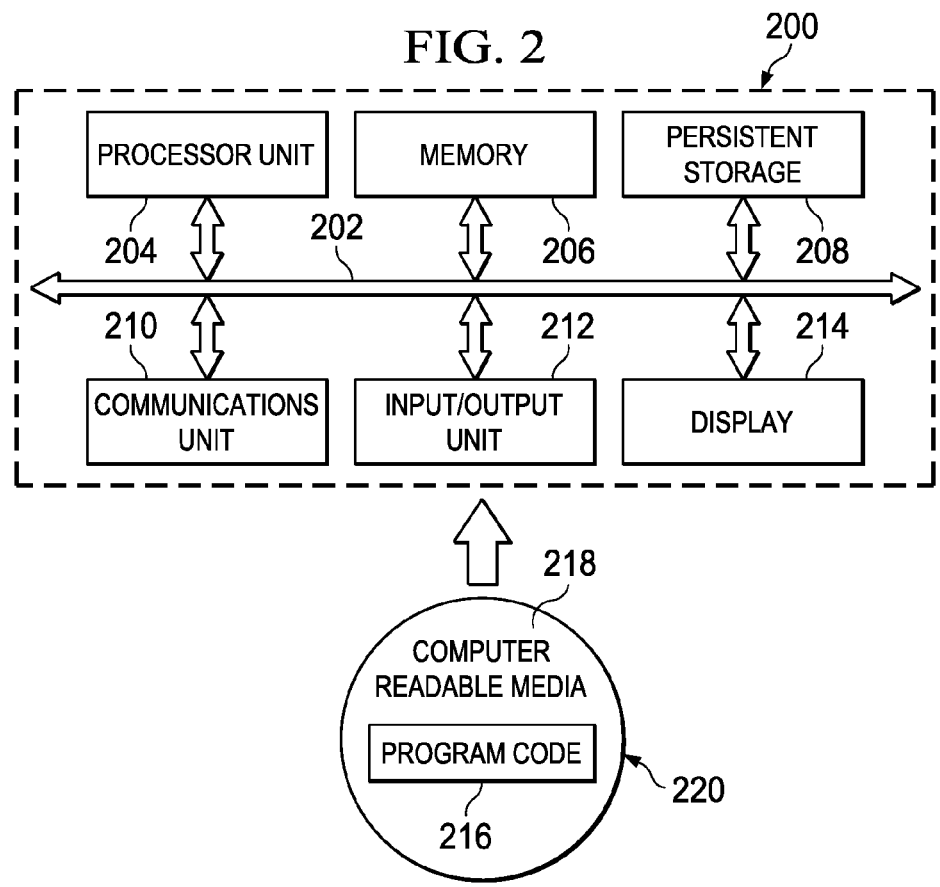
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention. Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible cloud-based portal or application executing on a set of one or more machines. End users operate Internet-connectable devices (e.g., desktop computers, notebook computers, Internet-enabled mobile devices, or the like) that are capable of accessing and interacting with the portal or application. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, virtualization techniques enable the configuration of physical resources. One such virtualization technique is "logical partitioning." Logical partitioning is the ability to make a server run as if it were two or more independent servers. When a server is logically partitioned, the resources on the server are divided into subsets called logical partitions. Software may be installed on a logical partition, and the logical partition runs as an independent logical server with the resources that are allocated to the logical partition. Processors, memory, and input/output (I/O) devices can be assigned to logical partitions. I/O devices include network adapters.

With virtual adapters, logical partitions can be connected with each other without using physical hardware. Operating systems can display, configure, and use virtual adapters just like they can display, configure, and use physical adapters. Depending on the operating environment used by the logical partition, virtual Ethernet adapters, virtual Fibre Channel adapters, virtual Small Computer Serial Interface (SCSI) adapters, and virtual serial adapters for a logical partition can be created and managed. Similarly, the Ethernet adapters are visible in the same way as physical Ethernet adapters. By default, virtual Ethernet Media Access Control (MAC) addresses are created from the locally administered range. Using the default MAC addresses, it is possible that different servers will have virtual Ethernet adapters with the same addresses.

Virtual Ethernet allows logical partitions to communicate with each other without having to assign physical hardware to the logical partitions. Virtual Ethernet adapters can be created on each logical partition and connected to virtual LANs. TCP/IP communications over these virtual LANs is routed through the server firmware. A logical partition can use virtual Ethernet adapters to establish multiple high-speed inter-partition connections within a single managed system. Logical partitions can communicate with each other using TCP/IP over the virtual Ethernet communications ports. Virtual Ethernet adapters are connected to an IEEE 802.1q (VLAN)-style virtual Ethernet switch. Using this switch function, logical partitions can communicate with each other by using virtual Ethernet adapters and assigning VLAN IDs that enable them to share a common logical network. The virtual Ethernet adapters are created and the VLAN ID assignments typically are done using a hardware management console. When configured, the system transmits packets by copying the packet directly from the memory of the sender logical partition to the receive buffers of the receiver logical partition, preferably without any intermediate buffering of the packet. An Ethernet bridge may be configured between the virtual LAN and a physical Ethernet adapter that is owned by a virtual server or a logical partition. The logical partitions on the virtual LAN can communicate with an external Ethernet network through the Ethernet bridge.

Virtualized Network Environments

Figure 3:
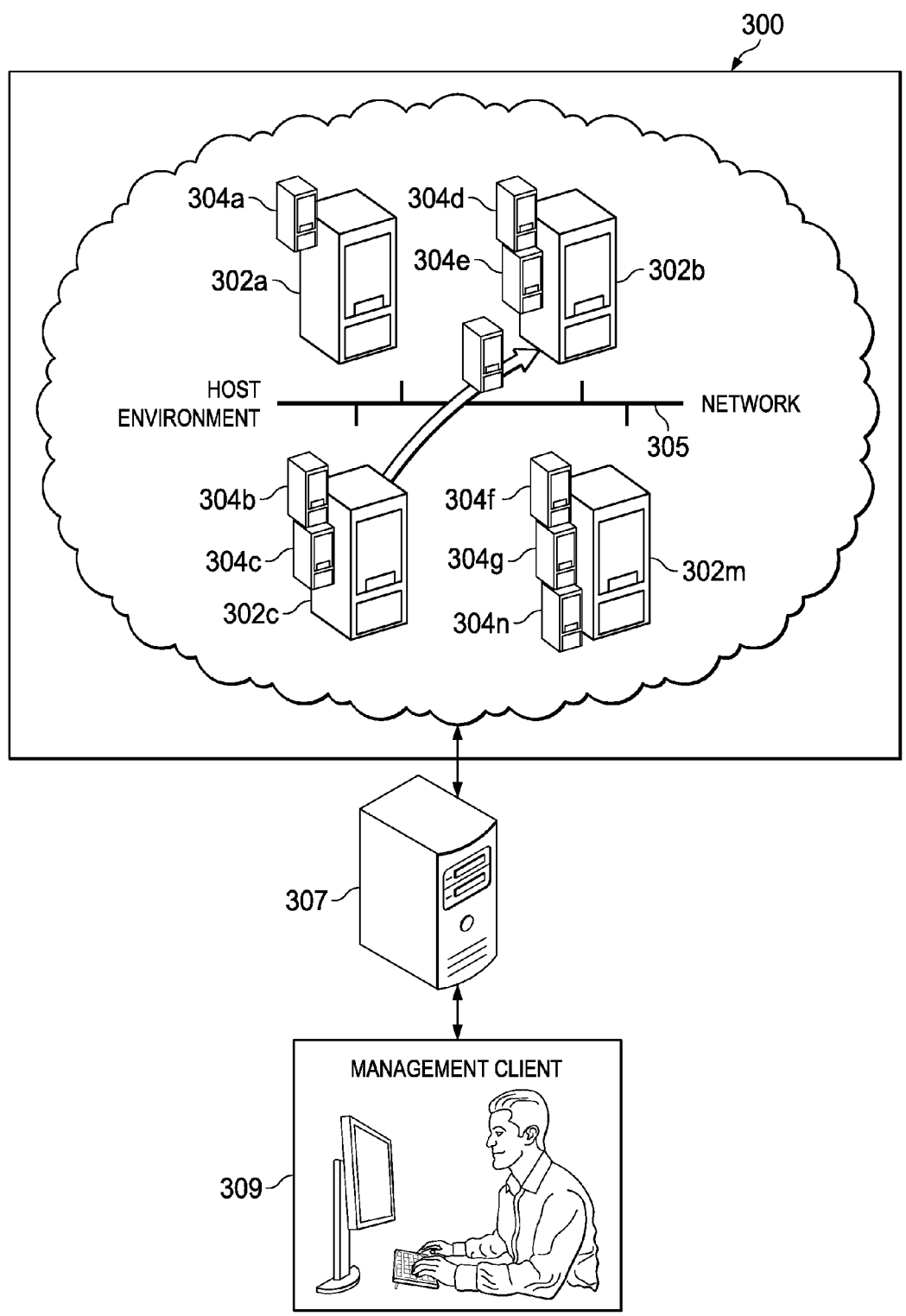
FIG. 3 illustrates an exemplary virtual networking environment.

In FIG. 3, an example virtual machine hosting environment 300 (sometimes referred to herein as a data center or "cloud") is illustrated. This environment comprises host machines (HM) (e.g., servers or like physical machine computing devices) connected via a network 305 and a management server 307. As shown in FIG. 3, physical servers 302a . . . 302m, are each adapted to dynamically provide one or more virtual machines ($VM_1$ . . . $VM_n$ denoted as 304a through 304n, respectively) using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. The management server 307 may be connected to a client console 309, or to a global management system that manages larger-scale infrastructure (if the data center is being managed with other data centers). The management server 307 monitors the infrastructure and automatically manipulates the VM placement as needed, e.g., by moving virtual machines between hosts, suspending/resuming virtual machines, and the like.

Software Defined Networking (SDN)

As noted above, Software Defined Networking (SDN) is a network paradigm that separates each network service from its point of attachment to the network, creating a far more dynamic, flexible, automated, and manageable architecture. Using SDN, administrators can move virtual resources throughout the network, create private virtual networks that meet specific performance and security needs, and use a host of other high-value applications. The key to SDN is an innovative approach to controlling how data flows through a network.

In a traditional network, data flow is controlled by switches and routers. Each switch and router contains several basic elements: a data plane, a control plane, and a management plane. The data plane physically carries data packets from one port to another by following rules that are programmed into the device hardware, and typically plane operates at the speed of the network (wire speed). The control plane contains the logic that the device uses to program the data plane, so packets are forwarded correctly throughout the network. The management plane enables an administrator to log-in to the device and configure it for basic activities. Most devices can be configured locally or through a network management tool. Vendors use control plane software to optimize data flow to achieve high performance and a competitive advantage. The switch-based control plane paradigm, however, gives network administrators little opportunity to increase data flow efficiency across the network as a whole. SDN abstracts flow control from individual devices to the network level. Similar to server virtualization, where virtual machines are de-coupled from the physical server, network-wide virtualization gives administrators the power to define network flows that meet the connectivity requirements of end stations and to address the specific needs of discrete user communities. SDN uses a modular approach that is structured and layered to provide the same functions as a traditional network device, yet in a centralized and highly-available fashion.

As further background, it is known to use a software defined network (SDN) controller to segregate and prioritize SDN-controlled routes in a switch routing table. One goal of a SDN is to allow the network to be programmable via a SDN controller. The SDN controller typically is physically separated from any of the controlled network switches, but is not necessarily located remotely therefrom. One method that allows for programmability of the network may involve the use of the OpenFlow communication protocol. Other applications that may allow for programmability of the network may be used, in addition to or in place of OpenFlow. Other methods that allow for the network to be programmable involve more traditional approaches, such as simple network management protocol (SNMP), network configuration protocol (NetConf), etc. In future versions of OpenFlow, support may be added for programming layer 3 IPv4 and layer 3 IPv6 Forwarding Elements via OpenFlow. Layer 3 forwarding element programming via OpenFlow may add support to program the Layer 3 forwarding table, also referred to as a Forwarding Information Base (FIB). In contrast to the Routing Information Base (RIB), the FIB is optimized for fast longest prefix match lookup of a destination internet protocol (IP) address and may be used for data path forwarding. OpenFlow Layer 3 forwarding element programming may be used by SDN user applications to program the Layer 3 forwarding tables, in some conventional uses.

Figure 4:
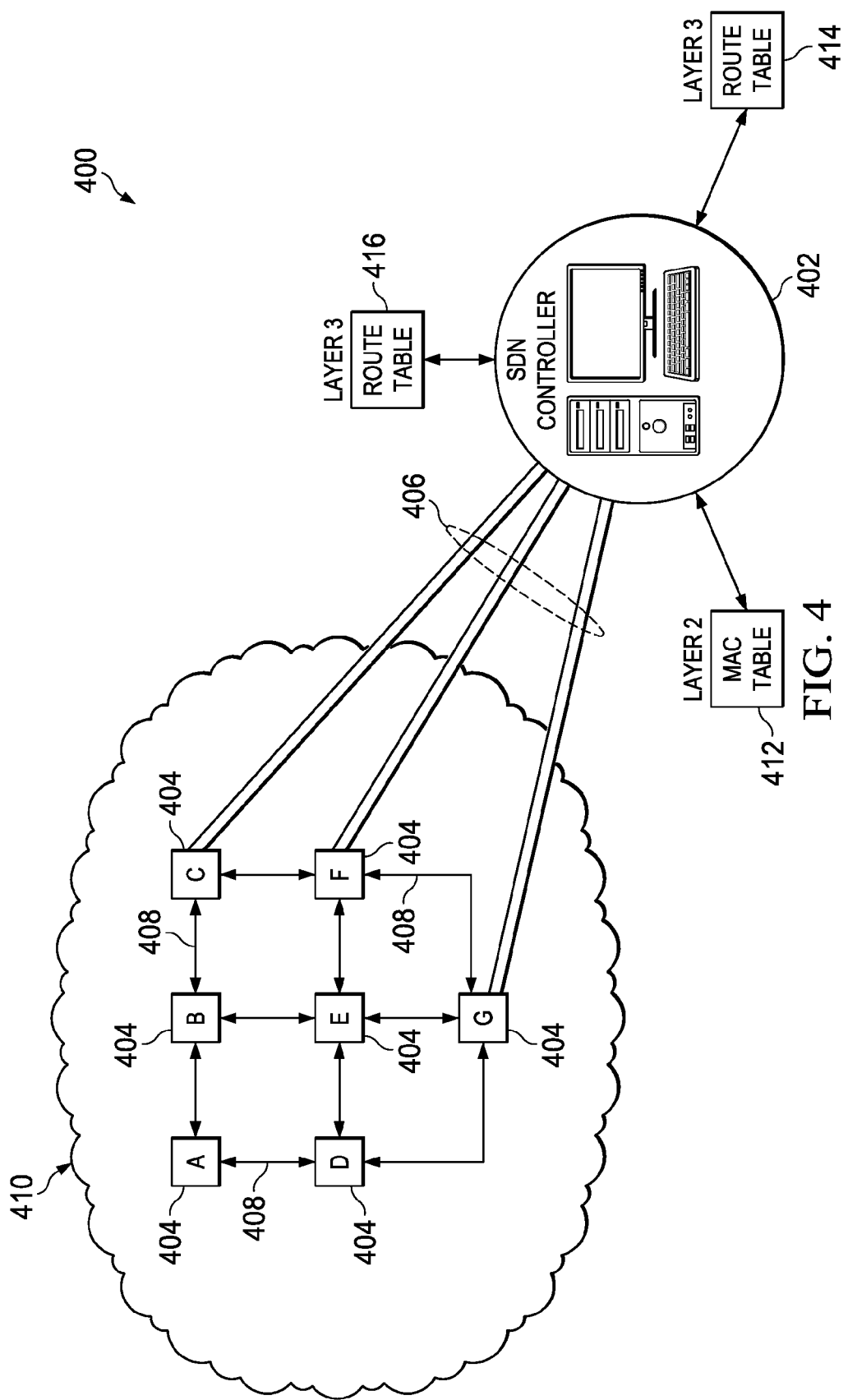
FIG. 4 illustrates an SDN environment managed by an SDN controller.

The SDN controller has logic integrated with and/or executable by a processor, wherein the logic is adapted to determine SDN routes through the network between the one or more devices and each of the plurality of switches, and to send one or more SDN routes to each switch in the network capable of communicating with the SDN controller. FIG. 4 illustrates this known functionality.

In FIG. 4, a system 400 comprises switches A-G 404, with each switch 404 connected in a network 410 via connections 408 of any known type, such as Ethernet (Cat 5, Cat5e, etc.), fiber channel (FC), optical fiber, coaxial cabling, multi-mode fiber, etc. The switches 404 may make use of a media access control (MAC) table 412 and a route table 414 within each switch 404 for choosing transmission routes between devices in the network 410, depending on whether the traffic is Layer 2 or Layer 3. In particular, the MAC table 412 may be used to determine destination addresses for Layer 2 traffic, while the route table 414 may be used to determination routes for delivery of Layer 3 traffic. With a SDN 410, route calculation functionality for each of the switches 404 may be moved from the processors (CPUs) of the switches 404 to a different system (which is not a switch or a router), namely, the SDN controller 402. The SDN controller 402 may perform the route calculations and send the route calculations to the switches 404, but not necessarily the route information. In this manner the SDN moves away from a distributed, to a centralized, mechanism, where the controller 402 learns about the whole network 410 and configures the route tables 414 and MAC tables 412 in a status that ultimately is used to decide which packet is delivered through which route.

Figure 5:
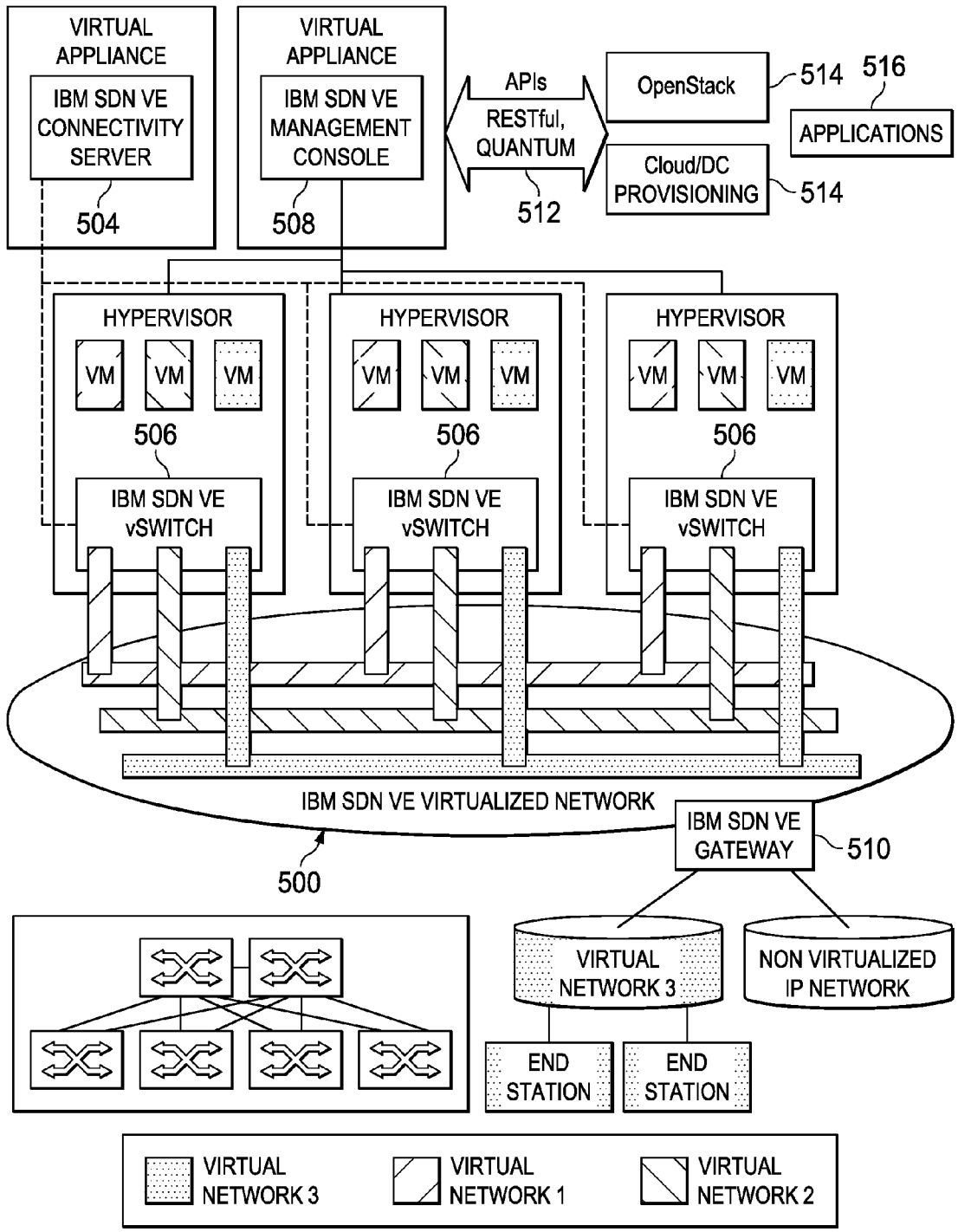
FIG. 5 depict an SDN-based virtual environment (VE) in which the techniques of this disclosure may be implemented.

An SDN-based virtual environment (VE) is shown in FIG. 5. This architecture provides an exemplary implementation to support SDN in the context of a virtual network (such as shown in FIG. 3). It provides for a multi-tenant SDN.

The SDN VE virtualized network 500 is built as an overlay on existing IP or OpenFlow network 502. A connectivity server 504 is the control place for the virtual network. It is a logically centralized entity that is responsible for determining forwarding decisions and network policy enforcement in the virtual network. This server corresponds to the SDN controller in FIG. 4. An overlay-enabled vSwitch 506 is the data plane of the virtual network. It is responsible for data traffic from source end station to destination end station. A management console 508 is the management plane. Users can create and manage virtual networks through the management console. One or more overlay gateways 510 are used to connect to non-virtualized end stations and connecting to physical networks. The network virtual solution provides application programming interfaces (APIs) 512 that orchestration tools 514 and applications 516 can use to programmatically access the network. In this example, there are three (3) virtual networks, corresponding to three (3) distinct tenants. A representative commercial implementation of this architecture may be implemented using IBM® SDN VE Virtualized Network.

As illustrated, the above-described architecture comprises a hardware layer (that includes the physical machines and resources), a hypervisor, and individual virtual machines. The virtual machines run on virtual networking technologies, such as VMware ESX/ESXi. An operating system, one or more applications, and other virtual resources, may be associated with a virtual machine. Representative platform technologies are, without limitation, IBM System X® servers with VMware vSphere 4.1 Update 1 and 5.0.

Processing Packets in Multi-Tenancy SDN

With the above as background, the subject matter of this disclosure is now described. Without limitation, the subject matter may be implemented within or in association with an SDN switch and SDN controller operating within a virtualized network environment as has been described above.

Multi-tenant support in this type of operating environment relies on several elements: data segregation, tenant-awareness, and multi-tenant capable. Data segregation refers to the notion that tenant-specific data (e.g., policy information, configuration information, and event information) is separated between and among tenants. Tenant-awareness refers to the notion of information processing (devices) that protect both physical and virtual network paths. Multi-tenant capable refers to the notion of information processing that applies specific tenant policy to tenant-specific information flows.

According to this disclosure, an SDN switch (e.g., vSwitch 506, as shown in FIG. 5) has one or more dedicated ports, which are referred to below as "information processing ports" (or "IPPs"). The smallest unit in each tenant is one such port, namely, the IPP, on the switch. Thus, a particular IPP on the switch can only be associated with one and only one tenant. Accordingly, the particular port-tenant association is unique and, as will be seen, these associations facilitate the tracking and enforcing of routing within or across the switch while at the same time assuring the data segregation and tenant isolation properties that are necessary to facilitate multi-tenant support. In this manner, the characteristics of a non-overlay SDN are leveraged to support multi-tenancy in an efficient manner, namely, by associating a specific tenant with a specific port (an IPP on the virtual switch) once, rather than continuously parsing tenant data from the information flow (as is required for processing flows encapsulated in tunneling protocols). As will be seen, the technique enables the application of tenant-specific policy to tenant-specific network flows.

In this approach, tenant flows are identified by associating their flows with specific ports (IPPs) on the virtual switch to which they are connected. A specific tenant is associated with a specific port once, rather than continuously. Direct network flow processing is then enabled in a manner for any type of packet processing device ("PPD") coupled to that IPP.

As used herein, a PPD may any type of virtual flow processor, such as a firewall, an intrusion prevention system (IPS), a content filters, and the like.

As will be seen, the technique of this disclosure includes several aspects. The first aspect is that the SDN controller maintains the tenancy on the SDN network using the notion of an IPP and port-tenant association table. As an example, FIG. 6 depicts an SDN switch 600 and its associated SDN controller 602. In this embodiment, there are two tenants, tenant A 604 having two machines 606 and 608, and tenant B 610 having two machines 612 and 614. Of course, the number of tenants and their associated machines are merely representative. A machine may be a physical machine, or a virtual machine. Each machine is coupled to a port on the switch 600. Thus, machine 606 is coupled to port 1, machine 608 is coupled to port 2, machine 612 is coupled to port 3, and machine 614 is coupled to port 4. The switch 600 may belong to one or more than one tenant; as long as there is more than one tenant running on the single switch 600, the SDN controller 602 needs to maintain the tenancy on the switch. As also shown, in this example there is one PPD, namely, IPS 616, which PPD is coupled to two other switch ports, namely port 5 and port 6. As will be described, each port 5 and 6 also is dedicated as an IPP.

To maintain the tenancy illustrated in FIG. 1, the SDN controller 602 needs to know which port on the switch (or any other switch) belongs to which tenant. To that end, the controller preferably maintains a port-tenant association table 700 such as illustrated in FIG. 7. In this embodiment, table 700 includes three (3) columns, a switch ID column 702, a port number column 704, and a tenant ID column 706. The structure of the table 700 maintaining the tenancy data is not limited to any form. The information may be maintained in other types of data structures, such as data arrays, linked lists, relational tables, or the like. Tenancy support can be added in the SDN controller provided the controller can look-up the tenant information (using the Tenant ID) using the switch-port information.

Figure 8:
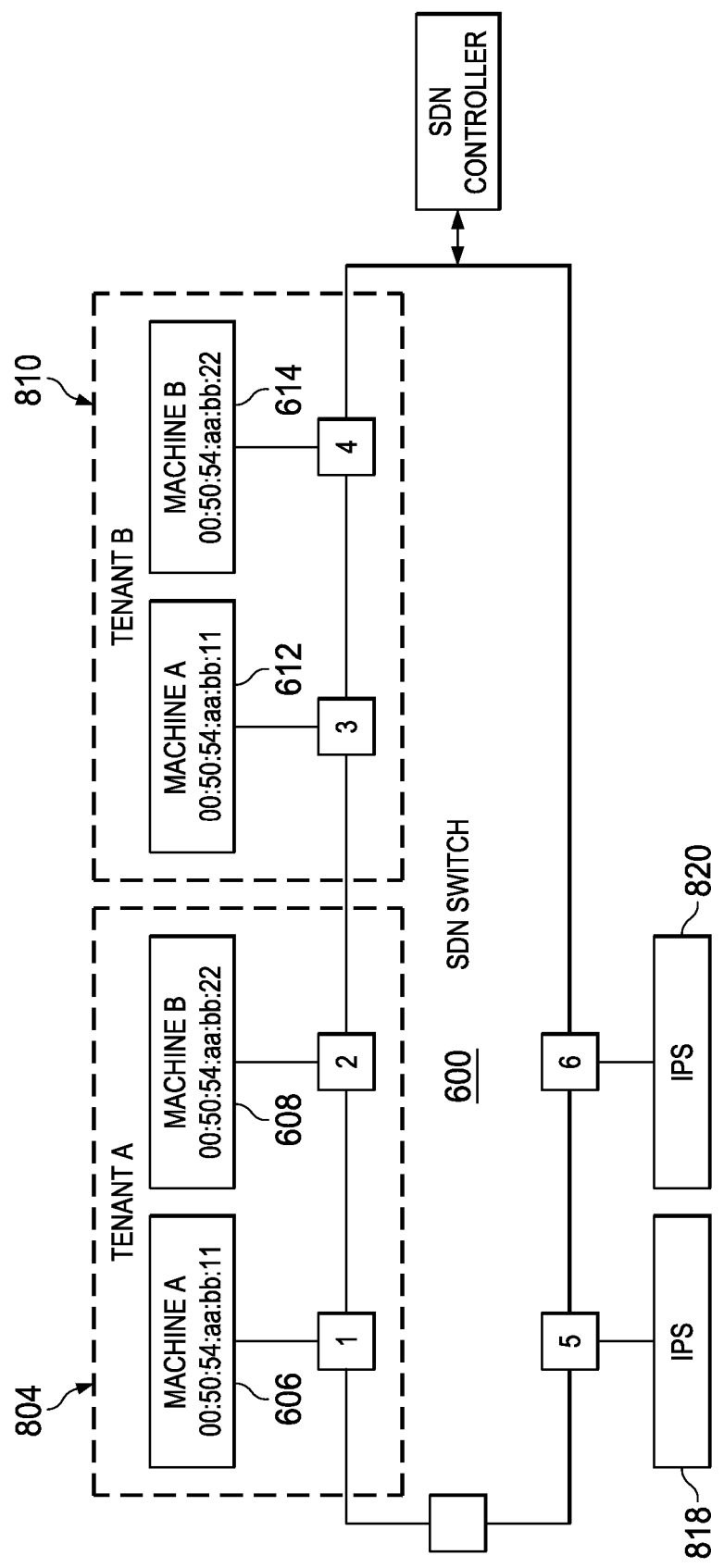
FIG. 8 depicts the SDN switch and associated SDN controller, wherein distinct information processing ports (IPPs) on the switch coupled to distinct packet processing devices (PPDs)
Figure 9:
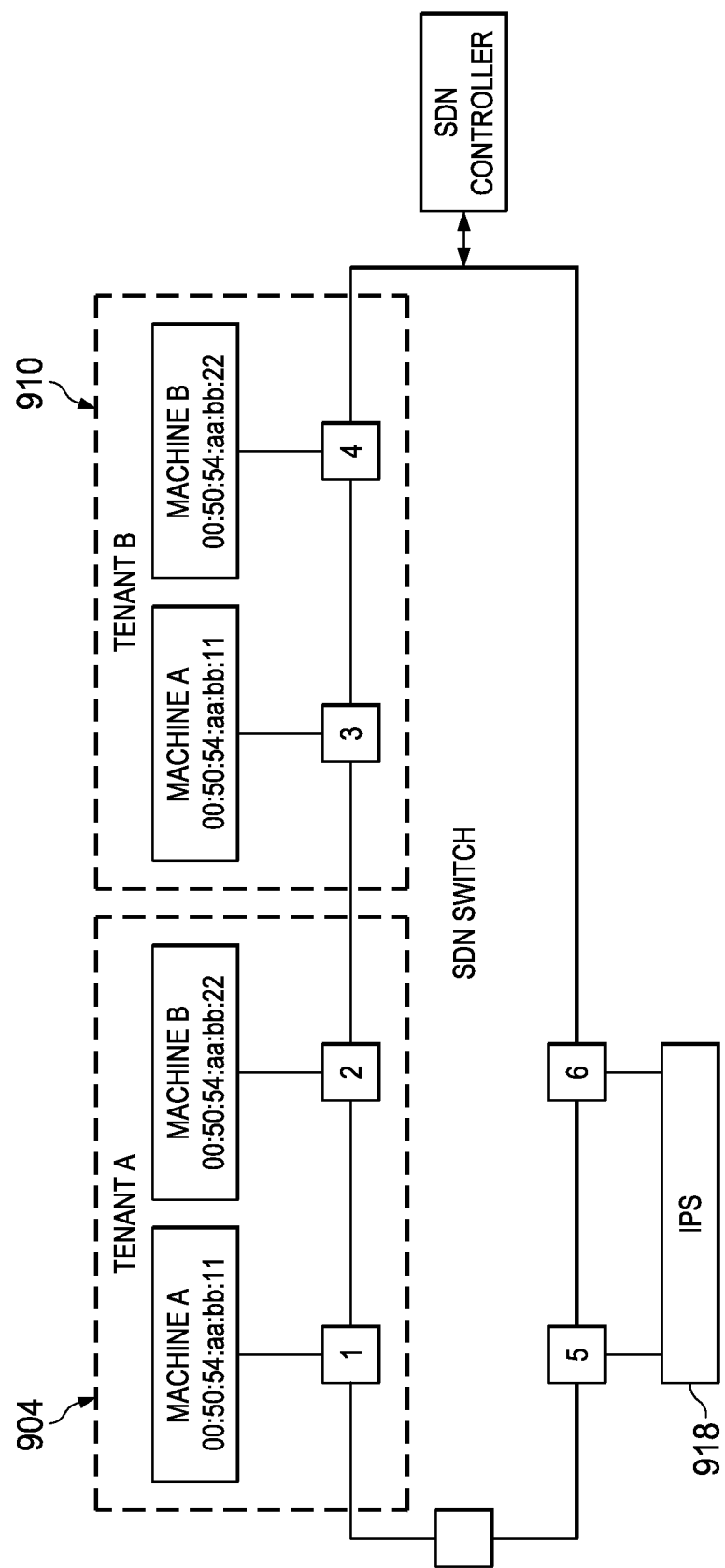
FIG. 9 depicts the SDN switch and associated SDN controller of FIG. 8, wherein distinct IPPs on the switch are coupled to the same PPD.

The use of dedicated information processing ports (IPPs) on the switch enables each IPP to provide its own processing capability, which may be the same as or different from the processing capability of any other IPP. Further, a PPD can be coupled (connected) to the SDN switch via one or more IPP. Using network traffic flow as an example, the processing capability may an IPS, a firewall, or some other packet flow processor. To process information from each tenant (in the tenancy), the SDN controller may provision one PPD for each tenant, or multiple IPPs may be provisioned on one PPD. FIG. 8 illustrates the former case, and FIG. 9 illustrates the latter case. In FIG. 8, there are once again two tenants A and B, and, in this example, two PPDs 818 and 820. In this example, tenant A 804 uses PPD 818, and tenant B uses PPD 820. In FIG. 9, there is just one PPD 918, and this PPD is used by both tenant A 904 and tenant B 910. In FIG. 9, and as illustrated, there are multiple IPPs (ports 5 and 6), with each IPP associated with a specific tenant. Thus, for example, tenant A uses IPP port 5, while tenant B uses IPP port 6.

Figure 10:
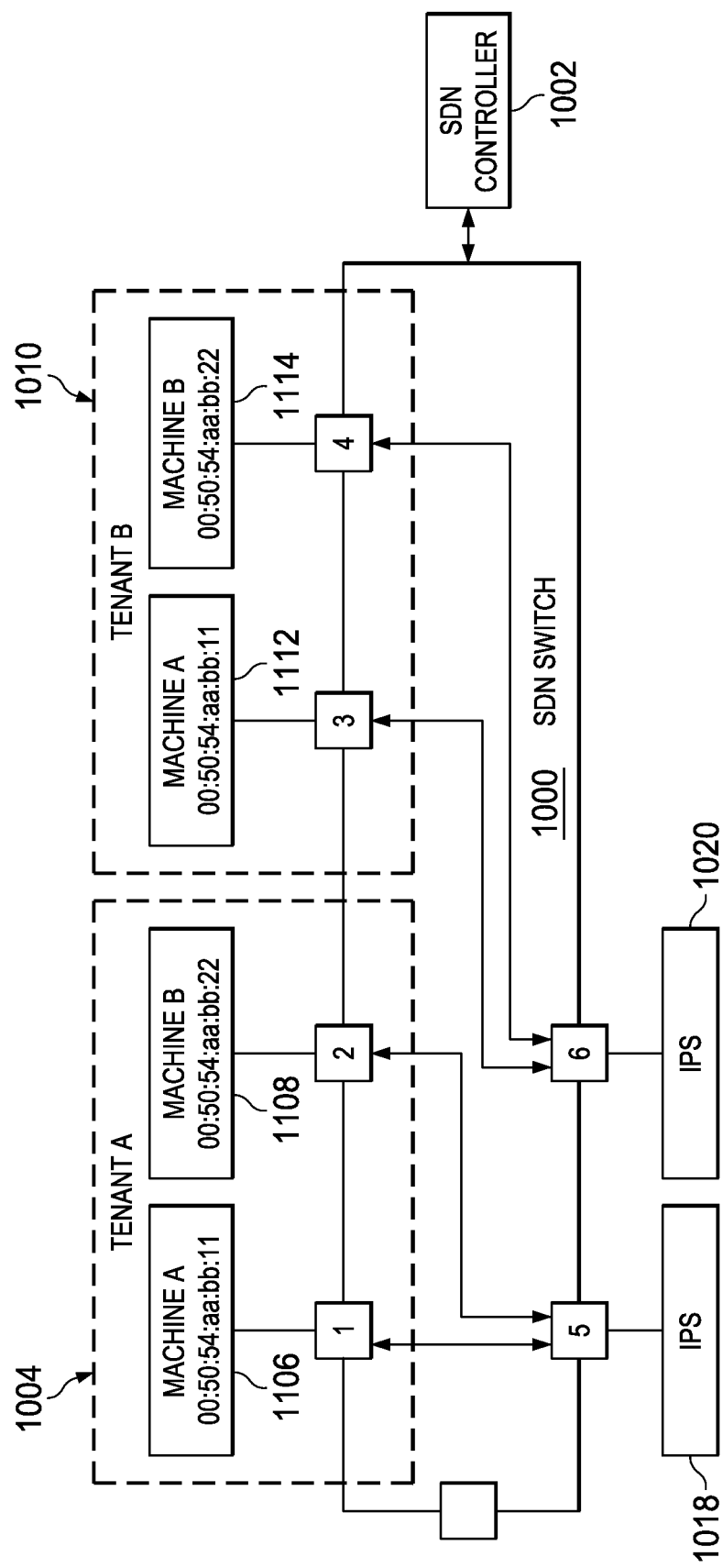
FIG. 10 depicts the FIG. 8 embodiment and illustrates the forwarding of network flows on the SDN switch.
Figure 11:
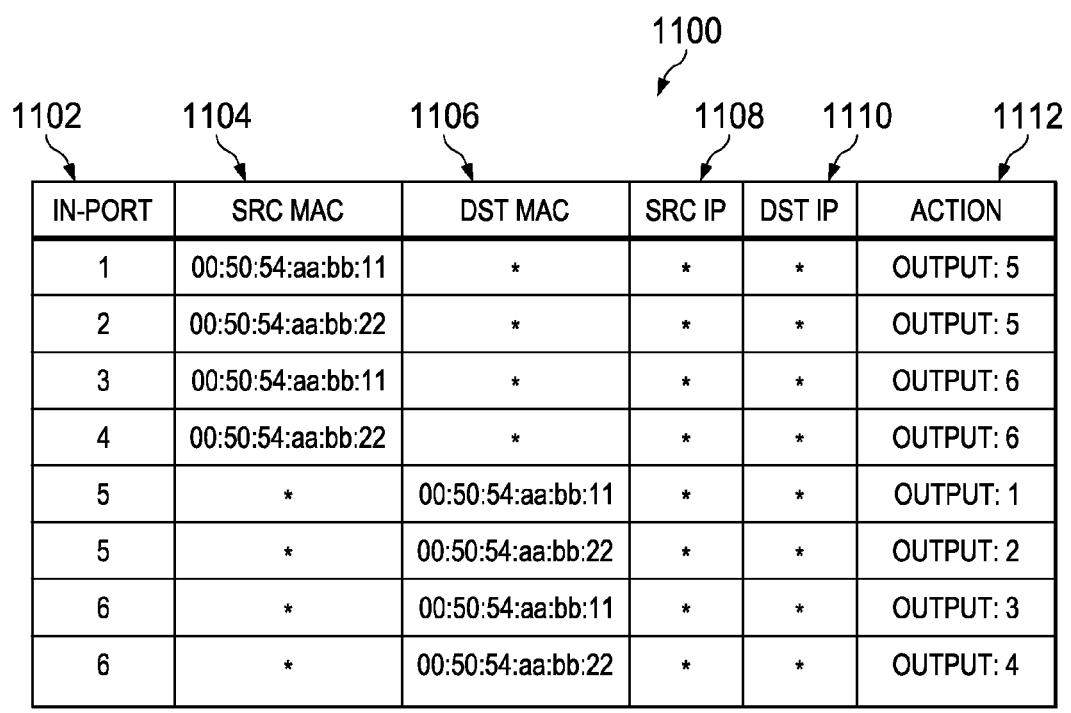
FIG. 11 depicts a representative forwarding rules table that facilitates the forwarding network flow shown in FIG. 10.

By dedicating IPPs to specific tenants, network flows across the switch may be managed while preserving tenancy. FIG. 10 illustrates this process for switch 1000 having an associated SDN controller 1002 in which the port-tenant association table (such as shown in FIG. 7) is maintained. Once again, there are two tenants, tenant A 1004, and tenant B 1010, and a pair of PPDs 1018 and 1020. This is the embodiment illustrated in FIG. 8. Here, there are two IPPs, with switch port 5 (the first IPP) coupled to the PPD 1018, and with switch port 6 (the second IPP) coupled to the PPD 1020. As described above in FIG. 3, the SDN controller 1002 has the native capability to push one or more packet forwarding rules to the SDN switch 1000 to output a packet to any port. FIG. 11 illustrates a representative packet forwarding rule table 1100 that may be used for this purpose. This particular forwarding rule table 1100 is merely exemplary, and it includes a set of columns: an input port column 1102, a source MAC address column 1104, a destination MAC address column 1104, a source IP address column 1106, a destination IP address column 1108, and an action column 1110. The particular values in the table are not intended to be limiting. The format of the packet forwarding rules depends on the SDN protocol. Table 1100 conforms to the OpenFlow protocol. Referring back to FIG. 10, it can be seen that the network flow(s) sent from the different tenants are then directed to different tenant ports according to the packet forwarding rules in the table. Thus, for example, the flow that originates from machine 1106 (machine A) for Tenant A 1014 is sent to port 5 (table 1100, first row), but the flow that originates from machine 1114 (machine B) for Tenant B is sent to port 6 (table 1100, fourth row). The other network flows are determined by the other packet forwarding rules as specified in the table 1100.

By maintaining both the port-tenant association table, and the packet forwarding rules table, the SDN controller thus has the capability of determining whether any changes to the packet forwarding rules (or, more generally, policy changes) might conflict with the tenancy established and maintained by the SDN controller. By using the managed table tenant/port associations, the SDN controller thus can evaluate policy changes before they are activated in the SDN to ensure that such changes do not conflict with existing configurations. This administration/monitoring function thus enables improved tenant-awareness because the SDN controller only distributes to the SDN switch fabric those policy changes that comply with the multi-tenant security policy.

Of course, the two tenants may send out two identical information flows. To process the flow using the corresponding policy in each tenant, the PPD must also know which tenant sent the flow. As noted above, the subject technique addresses this concern by binding the tenant information to the IPP (i.e., ensuring that each IPP only belongs to one tenant). Therefore, when the PPD receive the flow from an IPP to which it is coupled, the PPD can determine which tenant sent the flow. If the PPD has more than IPP, the PPD has the responsibility to use the correct policy to process the flow once it receives the tenant information bound to the flow.

Figure 12:
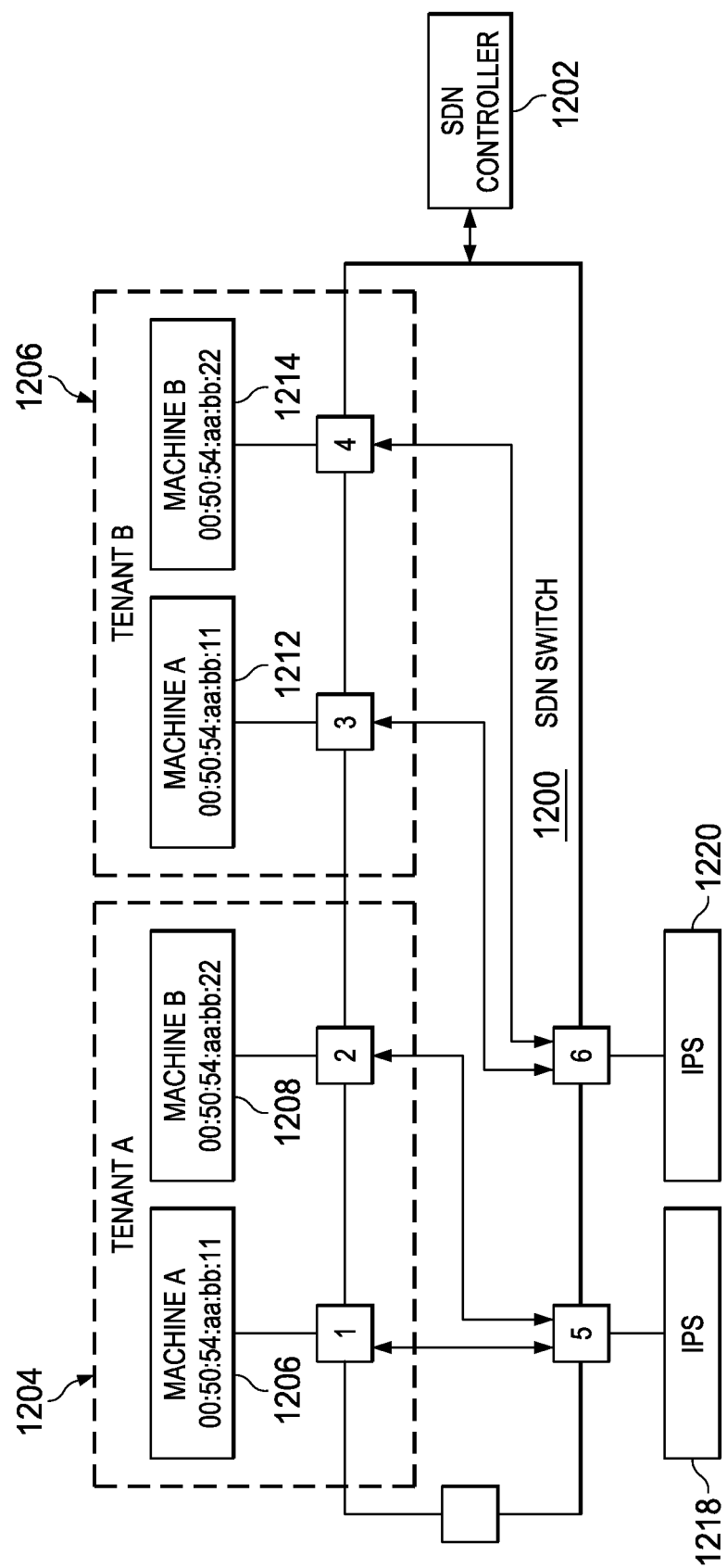
FIG. 12 depicts the FIG. 8 embodiment and illustrates how multiple PPDs may be coordinated using the techniques of this disclosure.

With reference now to FIG. 12, and as previously described, there may be multiple PPDs coupled to the switch 1200. Each PPD can provide a different function. In this example, PPD 001 1218 provides a first packet processing function, and PPD 002 1220 provides a second processing function distinct from the first processing function. As a concrete example, PPD 1218 may be an IPS, and PPD 1220 may be a firewall. If the multiple PPDs need to be coordinated, the SDN controller 1202 can provide the SDN switch 1200 with a suitable policy to control such coordination. The particular details of the coordination policy and its format will depend on the nature of the SDN controller, but a sample policy is shown in FIG. 13. There are multiple ways to define the forwarding behavior in the policy, and the table shown in FIG. 13 uses a firewall rule-like format. This is not intended to be limiting. Generalizing, the table (or, more generally, the policy) specifies which network flow sent from which place should be forwarded to which device. To that end, the policy is defined by a table 1300 that includes a set of columns: an input column 1302, a tenant ID column 1304, a source MAC address column 1306, a destination MAC address column 1308, a source IP address column 1310, a destination IP address column 1312, a source port column 1314, a destination port column 1316, and an action column 1318. In this example, which is merely representative, every packet sent out from the tenant "123" on Vswitch "001" is forwarded to PPD 001 1218 (in FIG. 12); after PPD 001 processes the packet, and according to the policy, it sends the packet to PPD 002 1220 (in FIG. 12) unless the source IP addresss (src_ip) is "1.2.3.4." According to the policy, if the src_ip is 1.2.3.4, the packet is "forwarded" to the destination. After PPD 002 processes the packet, it forwards the packet to the destination.

Referring back to FIG. 12, this operation is shown. In particular, at step (1), machine 1206 associated with the first tenant 1204 sends the packet to port 5, which couples it to PPD 1218. Once the packet is processed, it is forwarded at step (2) to PPD 1220. PPD 1218 and PPD 1220 each have different processing capability, as has been described. After PPD 1220 processes it, the packet is forwarded back to machine 1208 associated with the tenant 1204.

Generalizing, the SDN controller of this disclosure maintains tenant/port association data, and pushes to the switch per-tenant policy (e.g., packet forwarding rules) to ensure compliance with the multi-tenant security policy requirements. A per-tenant IPP on the switch enables traffic sent to or from a tenant to be distinguished from that of another tenant, even with respect to PPDs that share a particular switch port. The approach thus leverages direct SDN properties, while avoiding overlay overhead required to continuously parse tenant data from the information flows themselves.

The techniques of this disclosure provide significant advantages. As has been described and illustrated, the approach advantageously enables the application of tenant-specific policy to tenant-specific network flows. The approach obviates associating a tenant-specific flow with a protocol tunnel, or the requirement to continuously parse tenant data from the information flow itself. Rather, a specific tenant is associated with a specific IPP just once, and the tenant/port associations are then used to ensure that policy changes to be delivered to the switch fabric comply with the multi-tenant security policy. The SDN controller populates the policies (e.g., the packet forwarding rules) for the SDN switch (or across multiple such switches) to isolate each tenant.

As has been described, the technique herein preferably leverages several elements: maintenance within (or in association with) the SDN controller of a "table" of tenant/port associations, and a monitoring function by the SDN controller that SDN routing tables properly enforce the required properties dictated by those tenant/port associations. The managed table of tenant/port associations is maintained in the SDN controller, and a monitoring process evaluates policy changes prior to their activation in the SDN. Based on that evaluation, the SDN controller may alert an SDN administrator/operator of potential security property violations. These functions provide for a "tenant-aware" SDN, namely, by permitting the SDN controller to distribute to the SDN switch fabric only such changes that would comply with multi-tenant security policy.

As is well-known, one benefit of tenant segregation is the ability to insert virtual flow processors (i.e., firewalls, intrusion detection, and content analyzers, or other PPDs) into tenant-specific network flows. By dedicating a port on the vSwitch to act as an IPP according to this disclosure, the SDN controller can communicate to each switch in the network the policy required to route various tenant transmissions to dedicated PPDs. In this way, an SDN can effectively enforce and monitor a switch configuration to assure the appropriate PPD is assigned to the appropriate tenants. The techniques described herein therefore enrich existing SDN controllers, their vSwitch(s), and the resulting packet flow in the environment to achieve multi-tenancy with otherwise non-tenant aware SDN infrastructure.

The approach as described herein may be applied to both physical and virtual SDN switches. The technique may apply to all types of network services, and, as illustrated in FIG. 12, it advantageously enables chaining services together. Further, the technique is independent of any protocol, thereby to reduce overhead that might otherwise be incurred to introduce a client to the network environment.

Preferably, the SDN controller is implemented as programmable logic implemented in a processor. This programmable logic uses tenant/port association data, and the monitoring functionality as described, to maintain the multi-tenant SDN.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the SDN controller is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute or virtual networking management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The reference to "packet protection device" or PPD should not be taken to limit the disclosed subject matter to any particular type or source of packet inspection technology or software. The term is intended to refer generically to packet inspection functionality, which need not be a standalone product or set of code.

The IPP is a port on a physical SDN switch, or a port on a virtual SDN switch.

The techniques herein provide for improvements to technology or technical field, namely, virtual networking environments, as well as improvements to SDN switches and SDN controllers themselves.

Having described our invention, what we now claim is as follows.

The invention claimed is:

1. A method to process packets in a multi-tenant Software Defined Network (SDN) having a switch, comprising:
for each tenant in a set of multiple tenants that use the SDN, assigning a particular port of the switch as an information processing port (IPP) for the tenant, the IPP for the tenant being unique to the tenant;
maintaining a data set that associates a particular port with a particular tenant;
configuring the switch according to information in the data set and at least one tenant-specific policy; and
applying the at least one tenant-specific policy to a tenant-specific packet flow based on the IPP for the tenant.

2. The method as described in claim 1 wherein configuring the switch includes coupling a packet processing device (PPD) to the information processing port for the tenant, the packet processing device being identified in the tenant-specific policy.

3. The method as described in claim 1 further including:
identifying a change in a particular tenant-specific security policy;
using information in the data set to determine whether the change is permitted;
responsive to determining that the change is not permitted, providing an alert;
responsive to determining that the change is permitted, updating the particular tenant-specific security policy and instantiating the updated tenant-specific security policy in the switch.

4. The method as described in claim 1 wherein a tenant-specific policy is distinct or used by more than one tenant.

5. The method as described in claim 1 wherein the switch is one of:
a physical switch, and a virtual switch.

6. The method as described in claim 1 wherein the at least one tenant-specific policy is applied to a tenant-specific packet flow without overlay network encapsulation.

7. The method as described in claim 1 wherein applying the at least one tenant-specific policy forwards the tenant-specific packet flow to one or more packet processing devices coupled to at least the IPP for the tenant.

8. Apparatus associated with a switch, comprising:
a processor;
computer memory holding computer program instructions executed by the processor to process packets in a multi-tenant Software Defined Network (SDN) by:
for each tenant in a set of multiple tenants that use the SDN, assigning a particular port of the switch as an information processing port (IPP) for the tenant the IPP for the tenant being unique to the tenant;
maintaining a data set that associates a particular port with a particular tenant;
configuring the switch according to information in the data set and at least one tenant-specific policy; and
applying the at least one tenant-specific policy to a tenant-specific packet flow based on the IPP for the tenant.

9. The apparatus as described in claim 8 wherein configuring the switch includes coupling a packet processing device (PPD) to the information processing port for the tenant, the packet processing device being identified in the tenant-specific policy.

10. The apparatus as described in claim 8 wherein the computer program instructions are further operative to:
identify a change in a particular tenant-specific security policy;
use information in the data set to determine whether the change is permitted;
responsive to determining that the change is not permitted, provide an alert;
responsive to determining that the change is permitted, update the particular tenant-specific security policy and instantiate the updated tenant-specific security policy in the switch.

11. The apparatus as described in claim 8 wherein a tenant-specific policy is distinct or used by more than one tenant.

12. The apparatus as described in claim 8 wherein the switch is one of: a physical switch, and a virtual switch.

13. The apparatus as described in claim 8 wherein the at least one tenant-specific policy is applied to a tenant-specific packet flow without overlay network encapsulation.

14. The apparatus as described in claim 8 wherein applying the at least one tenant-specific policy forwards the tenant-specific packet flow to one or more packet processing devices coupled to at least the IPP for the tenant.

15. A computer program product in a non-transitory computer readable medium for use in a data processing system, the computer program product holding computer program instructions which, when executed by the data processing system, perform a method to process packets in a multi-tenant Software Defined Network (SDN) having a switch, the method comprising:

for each tenant in a set of multiple tenants that use the SDN, assigning a particular port of the switch as an information processing port (IPP) for the tenant, the IPP for the tenant being unique to the tenant;

maintaining a data set that associates a particular port with a particular tenant;

configuring the switch according to information in the data set and at least one tenant-specific policy; and applying the at least one tenant-specific policy to a tenant-specific packet flow based on the IPP for the tenant.

16. The computer program product as described in claim 15 wherein configuring the switch includes coupling a packet processing device (PPD) to the information processing port for the tenant, the packet processing device being identified in the tenant-specific policy.

17. The computer program product as described in claim 15 further including:

identifying a change in a particular tenant-specific security policy;

using information in the data set to determine whether the change is permitted;

responsive to determining that the change is not permitted, providing an alert;

responsive to determining that the change is permitted, updating the particular tenant-specific security policy and instantiating the updated tenant-specific security policy in the switch.

18. The computer program product as described in claim 15 wherein a tenant-specific policy is distinct or used by more than one tenant.

19. The computer program product as described in claim 15 wherein the switch is one of: a physical switch, and a virtual switch.

20. The computer program product as described in claim 15 wherein the at least one tenant-specific policy is applied to a tenant-specific packet flow without overlay network encapsulation.

21. The computer program product as described in claim 15 wherein applying the at least one tenant-specific policy forwards the tenant-specific packet flow to one or more packet processing devices coupled to at least the IPP for the tenant.

* * * * *